United States Patent
Sasaoka et al.

(10) Patent No.: US 6,704,135 B2
(45) Date of Patent: Mar. 9, 2004

(54) OPERATION MODE SWITCHING APPARATUS, RAMAN AMPLIFIER AND OPTICAL TRANSMISSION SYSTEM

(75) Inventors: Eisuke Sasaoka, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 101 days.

(21) Appl. No.: 10/007,668

(22) Filed: Dec. 10, 2001

(65) Prior Publication Data

US 2002/0097482 A1 Jul. 25, 2002

(30) Foreign Application Priority Data

Dec. 12, 2000 (JP) ........................................ 2000-377687

(51) Int. Cl.$^7$ ................................................ H01S 3/00
(52) U.S. Cl. ................................................ 359/334
(58) Field of Search ............................................ 359/334

(56) References Cited

U.S. PATENT DOCUMENTS

| | | | |
|---|---|---|---|
| 5,966,206 A | * 10/1999 | Jander | 356/73.1 |
| 6,292,288 B1 | 9/2001 | Akasaka et al. | 359/334 |
| 6,317,255 B1 | * 11/2001 | Fatehi et al. | 359/341.44 |
| 6,373,621 B1 | * 4/2002 | Large et al. | 359/334 |
| 6,441,950 B1 | * 8/2002 | Chen et al. | 359/334 |
| 6,452,715 B1 | * 9/2002 | Friedrich | 359/334 |
| 6,452,716 B1 | * 9/2002 | Park et al. | 359/334 |
| 6,452,721 B2 | * 9/2002 | Deguchi et al. | 359/341.33 |
| 6,462,861 B2 | * 10/2002 | Ohshima et al. | 359/334 |
| 6,498,677 B1 | * 12/2002 | Sun et al. | 359/341.4 |
| 6,510,000 B1 | * 1/2003 | Onaka et al. | 359/334 |
| 6,542,287 B1 | * 4/2003 | Ye et al. | 359/334 |
| 6,547,453 B1 | * 4/2003 | Stummer et al. | 385/88 |

FOREIGN PATENT DOCUMENTS

JP  2000-98433  4/2000  ............. G02F/1/35

OTHER PUBLICATIONS

"Tomorrow's networks: all packet, all optical, all automated", RHK Telecommunications Industry Analysis, Renaissance Esmeralda Resort, Palm Springs, California, Nov. 1–3, 2000.

* cited by examiner

*Primary Examiner*—Thomas G. Black
*Assistant Examiner*—Deandra M. Hughes
(74) *Attorney, Agent, or Firm*—McDermott, Will & Emery (57) ABSTRACT

The present invention relates to an operation mode switching apparatus comprising a structure for making it possible to minimize the waste of energy caused by troubles occurring in optical fiber lines and the like in order to efficiently utilize the energy consumed in an optical transmission system aimed for a long-term operation; a Raman amplifier including the operation mode switching apparatus; and an optical transmission system including the Raman amplifier. If an optical fiber line acting as an optical transmission medium breaks in the optical transmission system, the signal power detected from the optical fiber decreases, whereby it changes to a set value or less or the amount of decrease in signal power per unit time changes by a set value or more. The operation mode switching apparatus comprises a control section for monitoring such a change in signal power, thereby switching the pumping light supply operation from a communication mode to a wait mode for minimizing the waste of pumping energy in response to the occurrence of troubles.

16 Claims, 4 Drawing Sheets

OPERATION MODE SWITCHING APPARATUS, RAMAN AMPLIFIER AND OPTICAL TRANSMISSION SYSTEM

BACKGROUND OF THE INVENTION

1. Field of the Invention

The present invention relates to a Raman amplifier for Raman-amplifying signal powers of a plurality of channels included in a signal wavelength band, an operation mode switching apparatus employed in the Raman amplifier, and an optical transmission system including the Raman amplifier.

2. Related Background Art

As optical amplifiers employed in optical transmission systems for amplifying signal powers, Raman amplifiers utilizing Raman effects have been known (see Japanese Patent Application Laid-Open No. 2000-98433, for example) in addition to rare-earth-doped optical fiber amplifiers whose optical waveguide region is doped with a rare earth element (e.g., Er element). A Raman amplifier is an optical device which supplies Raman amplification pumping light to an optical fiber acting as an optical waveguide, and Raman-amplifies the power of a signal propagating through the optical waveguide. When the signal wavelength falls within the band of 1.55 μm, for example, the Raman amplification pumping light has a wavelength in the vicinity of 1.45 μm.

A rare-earth-doped optical fiber amplifier is formed into a module and installed in a repeater or the like in an optical transmission system. On the other hand, a Raman amplifier can not only be formed into a module and installed in a repeater or the like, but also supply high-power Raman amplification pumping light to an optical fiber line laid between repeating sections, so as to Raman-amplify the power of a signal propagating through the optical fiber line. Therefore, utilizing the Raman amplifier can lower the effective loss of signal power in the optical fiber line. Namely, the use of a Raman amplifier is favorable in terms of realizing long-distance transmission, since it can elongate the repeating section by effectively reducing the loss of signal power.

SUMMARY OF THE INVENTION

The inventor studied the prior art mentioned above and, as a result, has found the following problems. Namely, in an optical transmission system for Raman-amplifying the signal power in an optical fiber line, if the optical fiber line to which Raman amplification light is supplied breaks, then high-power pumping light will leak out from thus broken part. If the pumping light continuously leaks out of the optical fiber line as such, the pumping energy will be wasted. Also, if an optical waveguide (optical fiber) for carrying out Raman amplification breaks or other optical components fail in a module Raman amplifier, high-power pumping light will leak out, thus making it impossible to maintain a communicating state, thereby wasting the pumping energy.

For overcoming the problems mentioned above, it is an object of the present invention to provide an operation mode switching apparatus comprising a structure for making it possible to minimize the waste of energy caused by troubles occurring in optical fiber lines and the like in order to efficiently utilize the energy consumed in an optical transmission system aimed for a long-term operation; a Raman amplifier including the operation mode switching apparatus; and an optical transmission system including the Raman amplifier.

For achieving the above-mentioned object, the operation mode switching apparatus according to the present invention comprises a first detector for monitoring a change in signal power in an optical transmission line, and a control section for switching between a communication mode and a wait mode as an operation for supplying pumping light so as to adjust a power of the pumping light supplied to an optical waveguide. The first detector detects the power $P_S$ of a signal Raman-amplified in the optical waveguide to which the Raman amplification pumping light is supplied. The communication mode is an operation mode in which the power of pumping light supplied to the optical waveguide is maintained at a first level which enables Raman amplification or higher, whereas the wait mode is an operation mode in which the power of pumping light supplied to the optical waveguide is maintained at a second level, lower than the first level, including a stop of pumping light supply or less.

The Raman amplifier according to the present invention comprises an optical waveguide for Raman-amplifying a signal power when Raman amplification pumping light is supplied thereto, a pumping light source for supplying the Raman amplification pumping light to the optical waveguide, and an operation mode switching apparatus having the structure mentioned above (the operation mode switching apparatus according to the present invention). In this Raman amplifier, the power $P_S$ of a Raman-amplified signal is monitored by the first detector of the operation mode switching apparatus and, according to a result of detection from the first detector, the control section of the operation mode switching apparatus determines whether or not to switch between the operation modes for supplying the pumping light and carries out an adjustment of pumping light power including a stop of pumping light supply.

When the signal power $P_S$ changes to a set value (signal detection level) or less, the control section in the operation mode switching apparatus adjusts the power level of pumping light to the optical waveguide such that a state of the first level or higher shifts to a state of the second level or less. In this case, the switching between operation modes for supplying the pumping light can be determined easily. Also, the control section adjusts the power level of pumping light to the optical waveguide when the amount of decrease in signal power $P_S$ per unit time changes by a set value or more. In this case, a long-time fluctuation in signal power $P_S$ is kept from being erroneously determined to be a break in the optical waveguide.

The operation mode switching apparatus according to the present invention may further comprise a second detector for detecting the power $P_P$ of pumping light supplied to the optical waveguide. In this case, the control section determines the switching of operation modes for supplying the pumping light according to both of the signal power $P_S$ detected by the first detector and the pumping light power $P_P$ detected by the second detector. For example, the control section may adjust the power of pumping light supplied to the optical waveguide (switch from the communication mode to the wait mode) when the ratio ($P_S/P_P$) between the signal power $P_S$ and the pumping light power $P_P$ changes to a set value or less. Also, the control section may adjust the power of pumping light supplied to the optical waveguide (switch from the communication mode to the wait mode) when the amount of decrease in ratio ($P_S/P_P$) between the signal power $P_S$ and the pumping light power $P_P$ per unit time changes by a set value or more. In each case, a fluctuation in signal power $P_S$ caused by a long-time fluctuation in pumping light power $P_P$ is kept from being erroneously determined to be a break in the optical waveguide.

The switching between the communication mode and wait mode includes both of an operation for adjusting the pumping light power performed by the control section and an operation for connecting/blocking a pumping light propagation path itself. Namely, while an operation for adjusting the pumping light power in the control section such as the one mentioned above is carried out by directly controlling the driving current of the pumping light source, a shutter may be disposed between the pumping light source and the optical fiber line, and the control section may control the opening/closing of the shutter so as to block the propagation path of the pumping light emitted from the pumping light source if an operation for restoring the broken optical fiber line and the like can be completed in a short period of time.

The optical transmission system according to the present invention comprises an optical fiber line for transmitting signals of a plurality of channels included in a signal wavelength band, and a Raman amplifier having the structure mentioned above (the Raman amplifier according to the present invention) for Raman-amplifying signal powers of these channels. This optical transmission system is excellent in transmission quality, since the signal powers are Raman-amplified during the signal propagation. Also, the optical transmission system may be configured such that the Raman amplifier supplies the Raman amplification pumping light to the optical fiber line. In this case, the signal powers are Raman-amplified in the laid optical fiber line, whereby its repeating sections can be elongated. The optical transmission system may further comprise a bypass optical fiber line other than the main optical fiber line, and a line switch for switching the signal transmission path from the main optical fiber line to the bypass optical fiber line when the pumping light supply to the main optical fiber line is stopped or reduced (in the wait mode). In this case, the signal transmission is kept from being interrupted by an operation for restoring the main optical fiber line.

DETAILED DESCRIPTION OF THE PREFERRED EMBODIMENTS

In the following, embodiments of the operation mode switching apparatus, Raman amplifier, and optical transmission system according to the present invention will be explained in detail with reference to FIGS. 1, 2A, 2B, 3, and 4. In the explanation of the drawings, constituents identical to each other will be referred to with numerals identical to each other without repeating their overlapping descriptions.

First Embodiment

Figure 1:
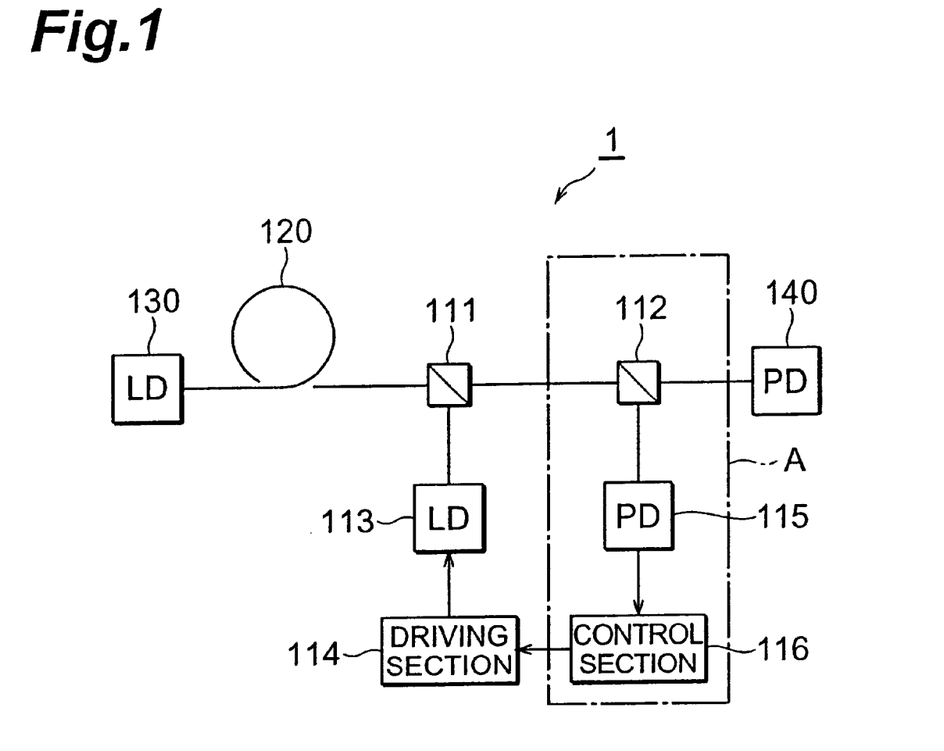
FIG. 1 is a diagram showing the configuration of a first embodiment of the optical transmission system (including an operation mode switching apparatus and a Raman amplifier) according to the present invention.

FIG. 1 is a diagram showing the configuration of a first embodiment in the optical communication system according to the present invention. This optical communication system 1 comprises an optical fiber line 120, a Raman amplifier employing the optical fiber line 120 as a Raman amplification medium, and an operation mode switching apparatus A included in the Raman amplifier. In the optical communication system 1, the optical fiber line 120, an optical multiplexer 111, and an optical branching device 112 are arranged successively from a transmitter 130 to a receiver 140. Also, the optical transmission system 1 includes a pumping light source 113 (LD) for outputting Raman amplification pumping light to the optical multiplexer 111, a driving section 114 for driving the pumping light source 113, a photodetector 115 (PD) for receiving signals having arrived from the optical branching device 112, and a control section 116 for driving and controlling the driving section 114 according to a signal outputted from the photodetector 115.

In the optical transmission system 1 according to the first embodiment, the operation mode switching apparatus A is constituted, at least, by the optical branching device 112, photodetector 115, and control section 116. The Raman amplifier is constituted, at least, by the optical multiplexer 111, pumping light source 113, driving section 114, and optical fiber line 120 together with the operation mode switching apparatus A.

The pumping light source 113 is a semiconductor laser (LD), for example, and is driven by the driving current supplied from the driving section 114, so as to output Raman amplification pumping light. The optical multiplexer 111 feeds the optical fiber line 120 with the pumping light outputted from the pumping light source 113, and the optical branching device 112 with the light (signal) having arrived from the optical fiberline 120. The optical branching device 112 causes a part of the light having arrived from the optical multiplexer 111 to branch out into the photodetector 115, while outputting the remainder to the receiver 140. The photodetector 115 is a photodiode (PD), for example, which receives the light having arrived from the optical branching device 112 and outputs an electric signal at a value corresponding to the power of thus received light. The control section 116 inputs the electric signal outputted from the photodetector 115, and drives and controls the driving section 114 according to the value of the electric signal so as to make it shift to one of the operation modes of the communication mode and wait mode.

For example, the following inspection is carried out in the optical transmission system 1 in order to verify the status of installation of the optical fiber line 120 acting as an optical transmission line. Namely, inspection light (inspection signal), outputted from the transmitter 130, for inspecting the optical fiber line (optical fiber to be inspected) 120 is lead to the optical fiber line 120. The inspection light propagates through the optical fiber line 120, which is an object to be inspected, and is Raman-amplified upon the propagation. Substantially all the inspection light outputted from the optical fiber line 120 passes through the optical multiplexer 111 and the optical branching device 112 in succession, thereby reaching the receiver 140. Thus, the receiver 140 can detect the optical power Raman-amplified in the optical fiber line 120 even in the case where the optical fiber line 120 to be inspected is long or where the optical fiber line 120 yields a large loss, whereby the optical transmission system 1 can inspect the optical fiber line 120 with a sufficient accuracy.

In the optical transmission system 1, the optical branching device 112 and photodetector 115 function as a detector for detecting the inspection light power Raman-amplified in the optical fiber line 120, i.e., the signal power $P_S$. According to the signal power $P_S$ detected by the photodetector 115, the control section 116 determines the state of pumping light supply to the optical fiber line 120 (operation mode). Namely, the control section 116 determines whether or not to switch from the communication mode in which the pumping light power is maintained at such a level that it can be Raman-amplified or higher to the wait mode in which the pumping light power is maintained at a low-output state including the pumping light supply stop state. In conformity to the determination made by the control section 116, the driving section 114 functions as a regulator for the pumping light power.

Figure 2A:
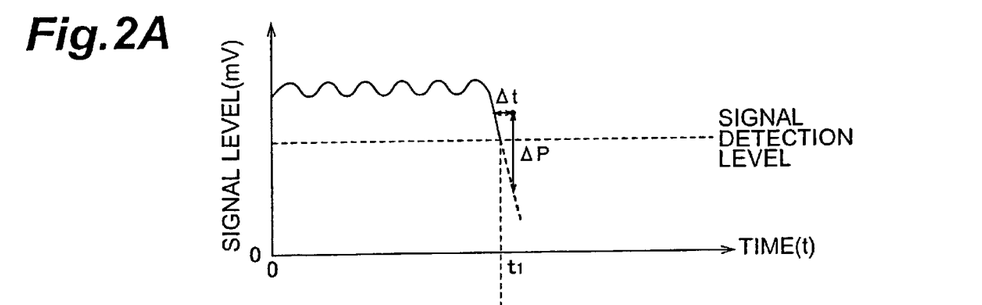
FIGS. 2A and 2B are graphs for showing respective changes in signal level and driving current of a pumping light source with time for explaining the switching between a communication mode and a wait mode.
Figure 2B:
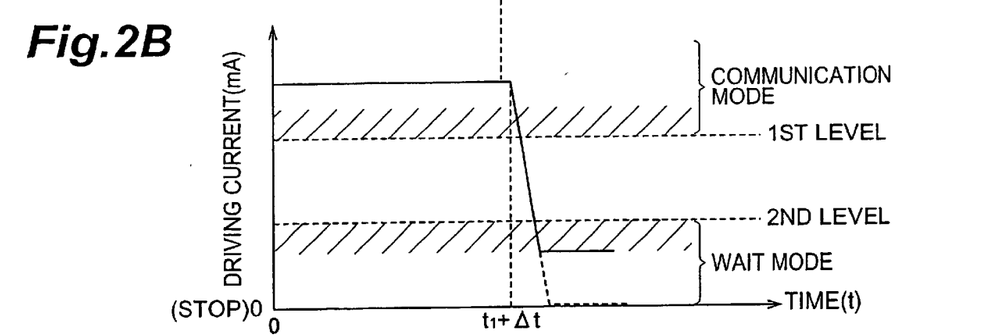

When it is detected at a timing $t_1 + \Delta t$ that the signal power $P_S$ changed to a set value (signal detection level) or less at a timing $t_1$ as shown in FIG. 2A in particular, the control section 116 controls the driving section 114 (in operation mode switching control) such that the driving current supplied to the pumping light source 113 shifts from a first level at which the driving current can be Raman-amplified (the level of driving current to be supplied to the pumping light source at the time of communication mode) or higher to a second level (a driving current level, including the state where the pumping light supply is stopped, at which an environment enabling an operation for restoring the optical fiber line can be provided) or less. In this case, operation modes for supplying pumping light can easily be determined by comparing the detected signal power and the set value with each other.

The control section 116 may also carry out operation mode switching control for pumping light supply (see FIG. 2B) when it is detected that the amount of decrease ($\Delta P$) in signal power $P_S$ per unit time ($\Delta t$) changed by a set value or more (see FIG. 2A). In this case, a long-time fluctuation in signal power $P_S$ is kept from being erroneously determined to be a break in the optical fiber line 120.

When the optical fiber line 120 breaks in such an optical transmission system 1, the signal power $P_S$ detected by the photodetector 115 decreases, whereby the signal power $P_S$ changes to a set value or less, or the amount of decrease in the signal power $P_S$ per unit time drastically changes by a set value or more. In response to the decrease in signal power $P_S$, the control section 116 determines the operation mode switching of pumping light supply to the optical fiber line 120. The driving section 114 having received the instruction from the control section 116 reduces the power of pumping light supplied to the optical fiber line 120 to a predetermined level or less, or stops the pumping light supply itself. Since the pumping light supply operation mode is switched from the communication mode to the wait mode as such at the time when the occurrence of a failure is detected in the optical fiber line 120, the pumping energy can effectively be kept from being wasted.

Second Embodiment

Figure 3:
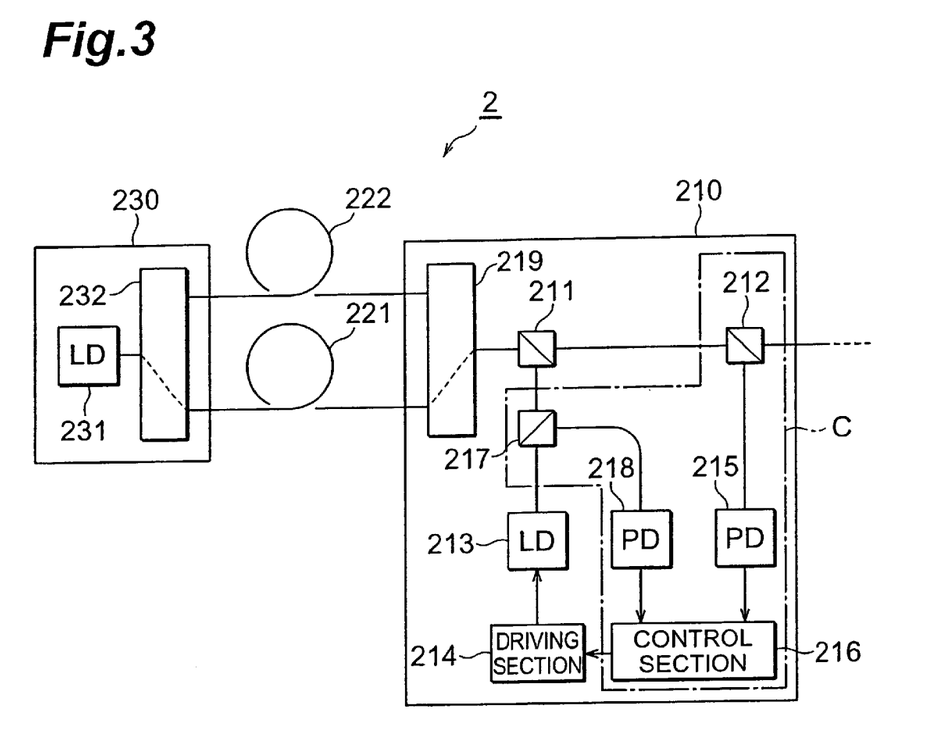
FIG. 3 is a diagram showing the configuration of a second embodiment of the optical transmission system (including an operation mode switching apparatus and a Raman amplifier) according to the present invention.

FIG. 3 is a diagram showing the configuration of a second embodiment in the optical transmission system according to the present invention. This optical transmission system 2 also includes a Raman amplifier and an operation mode switching apparatus B. The optical transmission system 2 comprises a transmitter 230, a repeater 210, and optical fiber lines 221, 222 laid between the transmitter 230 and repeater 210. The transmitter 230 includes a signal source 231 (LD) and an optical switch section (line switch) 232. The signal source 231 sends out a signal having a predetermined wavelength. The optical switch section 232 guides the signal sent out from the signal source 231 to one of the optical fiber lines 221 and 222.

In the repeater 210, an optical switch section (line switch) 219, an optical multiplexer 211, and an optical branching device 212 are arranged successively from its entrance end to exit end. Also, the repeater 210 includes a pumping light source (LD) 213 for outputting Raman amplification pumping light to the optical multiplexer 211, a driving section 214 for driving the pumping light source 213, a photodetector (PD) 215 for receiving light having arrived from the optical branching device 212, an optical branching device 217 disposed between the pumping light source 213 and the optical multiplexer 211, a photodetector (PD) 218 for receiving light having arrived from the optical branching device 217, and a control section 216 for controlling the driving section 214 (in operation mode switching control of pumping light supply) according to respective electric signals outputted from the photodetectors 215 and 218.

In the optical transmission system according to the second embodiment, the operation mode switching apparatus B is constituted, at least, by the optical branching device 212, photodetector 215, optical branching device 217, photodetector 218, and control section 216. The Raman amplifier is constituted, at least, by the optical multiplexer 211, pumping light source 213, optical switch section 219, and optical fiber line 221 (or optical fiber line 222) together with the operation mode switching apparatus.

The optical switch section 232 in the transmitter 230 and the optical switch section 219 in the repeater 210 operate in synchronization with each other. When the transmitter 230 is set such that the signal sent out from the signal source 231 is made incident on the optical fiber line 221 by the optical switch section 232, for example, the repeater 210 is set such that the Raman amplification pumping light having arrived from the optical multiplexer 211 is made incident on the optical fiber line 221 by the optical switch 219.

The pumping light source 213 is a semiconductor laser (LD), for example, and is driven by the current supplied from the driving section 214, so as to output Raman amplification pumping light. The optical branching device 217 causes a part of the light outputted from the pumping light source 213 to branch out into the photodetector 218, while outputting the remainder to the optical multiplexer 211. The photo detector 218 is a photodiode (PD), for example, which receives the light having arrived from the optical branching device 217 and outputs an electric signal at a value corresponding to the power of thus received light. The optical multiplexer 211 feeds the optical switch section 219 with the pumping light having arrived from the optical branching device 217, and the optical branching device 212 with the light (signal) having arrived from the optical switch section 219. The optical branching device 212 causes a part of the light outputted from the optical multiplexer 211 to branch out into the photodetector 215, while outputting the remainder to a downstream stage. The photodetector 215 is a photodiode (PD), for example, which receives the light having arrived from the optical branching device 212 and outputs an electric signal at a value corresponding to the power of thus received light. The control section 216 inputs the respective electric signals outputted from the photodetectors 215 and 218, and controls the driving section 214 (in operation mode switching control of pumping light supply).

In the transmitter 230, the light (signal) sent out from the signal source 231 is transmitted to the optical fiber line 221 by way of the optical switch section 232. The light having entered the optical fiber line 221 propagates through the optical fiber line 221 and reaches the repeater 210 after being Raman-amplified upon the propagation. The light having reached the repeater 210 passes through the optical switch section 219 and, with substantially all its power passing through the optical multiplexer 211 and optical branching device 212 in succession, is outputted to a downstream stage. Thus, the optical transmission system 2 is excellent in transmission quality, since the signal Raman-amplified in the optical fiber line 221 reaches the repeater 210 even in the case where the optical fiber line 221 is long or where the optical fiber line 221 yields a large loss.

In the optical transmission system 2 according to the second embodiment, the optical branching device 212 and photodetector 215 function as a detector (first detector) for detecting the signal power $P_S$ Raman-amplified in the optical fiber line 221. The optical branching device 217 and photodetector 218 function as a detector (second detector) for detecting the power $P_P$ of pumping light supplied to the optical fiber line 221. According to both of the signal power $P_S$ detected by the photodetector 215 and pumping light power $P_P$ detected by the photodetector 218, the control section 216 determines whether or not the operation mode switching is necessary between the communication mode and wait mode as an operation of supplying pumping light to the optical fiber line 221, and carries out operation mode switching control for the driving section 214 according to the result of determination.

While monitoring the signal power $P_S$, the control section 216 may carry out the operation mode switching control of pumping light supply as in the first embodiment when the signal power $P_S$ changes to a set value or less or when the amount of decrease in signal power $P_S$ per unit time changes by a set value or more (see FIG. 2A). Alternatively, it may carry out the operation mode switching control for the driving section 214 according to both of the signal power $P_S$ and the pumping light power $P_P$. Namely, in the optical transmission system according to the second embodiment, the control section 216 carries out the operation mode switching control for the driving section 214 from the communication mode to the wait mode so as to suppress the power of pumping light outputted from the pumping light source 213 when the ratio ($P_S/P_P$) between the signal power $P_S$ and pumping light power $P_P$ changes to a set value or less. The control section 216 may also carry out the operation switching control similarly when the amount of decrease in ratio ($P_S/P_P$) per unit time changes by a set value or more. In each case, a fluctuation in signal power $P_S$ caused by a long-time fluctuation in pumping light power $P_P$ is kept from being erroneously determined to be a break in the optical fiber line 220 to be inspected. In the optical transmission system 2 according to the second embodiment, the control section 216 may determine whether or not the operation mode switching between the communication mode and wait mode as an operation for supplying pumping light to the optical fiber line 221 is necessary according to a value of a function in which the signal power $P_S$ and pumping light power $P_P$ are variables.

When the optical fiber line 221 breaks in such an optical transmission system 2, the signal power $P_S$ detected by the photodetector 215 decreases, whereby the ratio ($P_S/P_P$) changes to a set value or less, or the amount of decrease in ratio ($P_S/P_P$) per unit time changes by a set value or more. When the control section 216 determines it necessary to adjust the power of pumping light supplied to the optical fiber line 221 (switch from the communication mode to the wait mode) in response to the decrease in ratio ($P_S/P_P$), the driving section 214 having received the instruction from the control section 216 reduces the driving current supplied to the pumping light source 213 to a level attaining the wait mode or less (see FIG. 2B). The time when the driving current from the driving section 214 to the pumping light source 213 becomes 0 mA corresponds to the state where the supply of pumping light is stopped. As in the foregoing, a failure such as a break of the optical fiber line 221 by which the communication state cannot be maintained is detected, and the pumping light supply operation is rapidly switched from the communication mode in which such driving current that the pumping light power can be Raman-amplified is supplied to the pumping light source 213 to the wait mode in which the driving current is lowered (the pumping light power outputted from the pumping light source 213 is lowered or the supply of pumping light is stopped), whereby an optical transmission system which is operable for a long term is realized more efficiently.

When the optical fiber line 221 breaks in the optical transmission system 2 according to the second embodiment, each of the optical switch sections 219 and 232 maybe changed over, whereby the optical fiber line 222 can be utilized for optical transmission in place of the broken optical fiber line 221. This can keep the signal transmission from being interrupted by an operation for restoring the optical fiber line 221.

Third Embodiment

Figure 4:
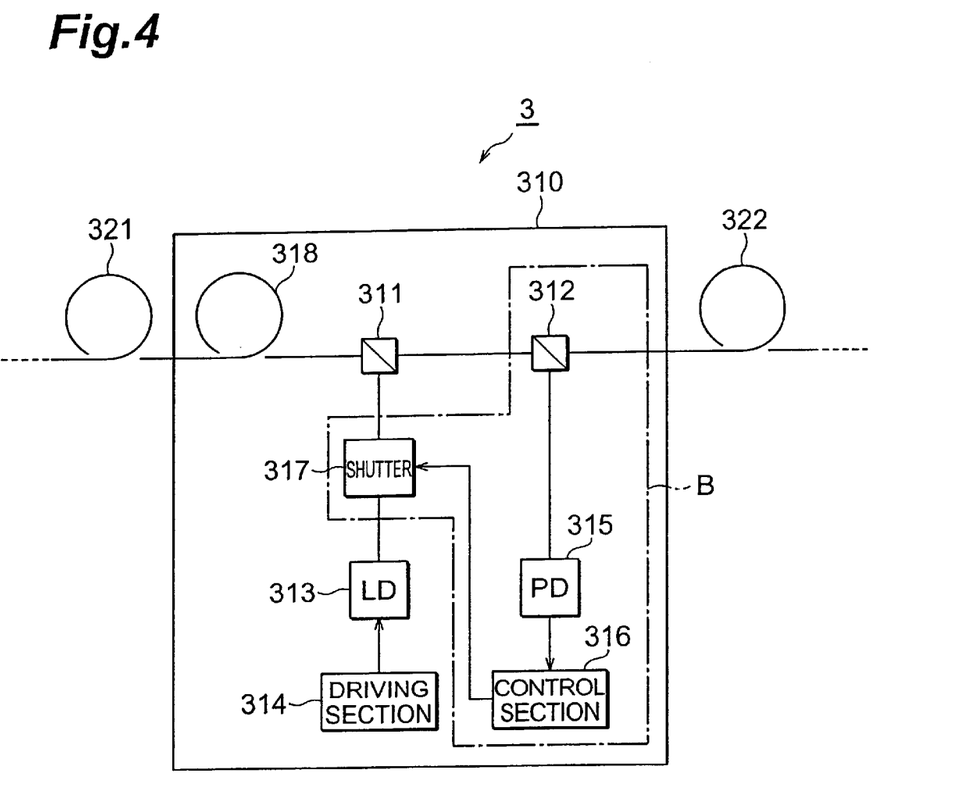
FIG. 4 is a diagram showing the configuration of a third embodiment of the optical transmission system (including an operation mode switching apparatus and a Raman amplifier) according to the present invention.

FIG. 4 is a diagram showing the configuration of a third embodiment in the optical transmission system according to the present invention. The optical transmission system 3 also includes an operation mode switching apparatus C and a Raman amplifier. This optical transmission system 3 includes a repeater 310, an optical fiber line 321 laid upstream the repeater 310, and an optical fiber line 322 laid downstream the repeater 310. Signals propagated through the optical fiber line 321 further propagate through the optical fiber line 322 with its power being Raman-amplified in the repeater 310.

In the repeater 310, a Raman amplification optical fiber 318, an optical multiplexer 311, and an optical branching device 312 are arranged in succession from its entrance end to exit end. Also, the repeater 310 includes a pumping light source (LD) 313 for outputting the Raman amplification pumping light to the optical multiplexer 311, a driving section 314 for driving the pumping light source 313, a photodetector (PD) 315 for receiving the light (signal) having arrived from the optical branching device 312, a shutter 317 disposed between the pumping light source 313 and the optical multiplexer 311, and a control section 316 for controlling the opening/closing of the shutter 317 according to a signal outputted from the photodetector 315.

In the optical transmission system 3 according to the third embodiment, the operation mode switching apparatus C is constituted, at least, by the optical branching device 312, photodetector 315, control section 316, and shutter 317. The Raman amplifier is constituted, at least, by the optical multiplexer 311, pumping light source 313, driving section 314, and Raman amplification optical fiber 318 in addition to the operation mode switching apparatus C.

The pumping light source 313 is a semiconductor laser LD, for example, and is driven by the driving current supplied from the driving section 314, so as to output the Raman amplification pumping light. The optical multiplexer 311 feeds the Raman amplification optical fiber 318 with the pumping light passing through the shutter 317 after being outputted from the pumping light source 313, and the optical branching device 312 with the light (signal) having arrived from the Raman amplification optical fiber 318. The optical branching device 312 causes a part of the light having arrived from the optical multiplexer 311 to branch out into the photodetector 315, and outputs the remainder to a downstream stage. The photo detector 315 is a photodiode PD, for example, which receives the light having arrived from the optical branching device 312 and outputs an electric signal at a value corresponding to the power of thus received light. The control section 316 inputs the electric signal outputted from the photodetector 315, and controls the opening/closing of the shutter 317 (corresponding to the switching control between the communication mode for supplying the pumping light and the wait mode for stopping the pumping light supply) according to the value of electric signal.

The signal having reached the repeater 310 after propagating through the optical fiber line 321 propagates through the Raman amplification optical fiber 318 with its power being Raman-amplified upon the propagation. Substantially all the power-amplified signal successively passes through the optical multiplexer 311 and optical branching device 312, so as to be outputted to a further downstream stage. The optical transmission system 3 according to the third embodiment is excellent in transmission quality, since the signal having its power Raman-amplified in the Raman amplification optical fiber 318 in the repeater 310 is thus outputted to a further downstream stage even in the case where the optical fiber line 321 is long or where the optical fiber line 321 yields a large loss.

In the optical transmission system 3, the optical branching device 312 and the photodetector 315 function as a detector for detecting the power $P_S$ of the signal Raman-amplified in the Raman amplification optical fiber 318. According to the signal power $P_S$ detected by the photodetector 315, the control section 316 determines whether or not to stop supplying the pumping light to the Raman amplification optical fiber 318, and controls the opening/closing of the shutter 317 according to the result of determination. Namely, the control section 316 carries out the switching control from the communication mode to the wait mode according to the result of detection from the photodetector 315. In the case where an operation for restoring the optical fiber line 321 or the like is accomplished in a short period of time, a configuration which blocks the supply of pumping light itself without controlling the pumping light power as such is also effective.

When the signal power $P_S$ changes to a set value or less or the amount of decrease in signal power $P_S$ per unit time changes by a set value or more in particular, the control section 316 determines that the supply of pumping light to the Raman amplification optical fiber 318 should be stopped.

When the optical fiber line 321 or Raman amplification optical fiber 318 breaks in such an optical transmission system 3, the signal power $P_S$ detected by the photodetector 315 decreases, whereby the signal power $P_S$ changes to a set value or less or the amount of decrease in signal power $P_S$ per unit time changes by a predetermined value or more. When the control section 316 determines that the supply of pumping light to the Raman amplification optical fiber 318 should be stopped in response to the decrease in signal power $P_S$, the shutter 317 having received the instruction from the control section 316 is closed (switching from the communication mode to the wait mode), whereby the supply of pumping light to the Raman amplification optical fiber 318 is stopped.

In accordance with the present invention, as in the foregoing, the operation mode switching apparatus monitors changes in signal power $P_S$, so that the pumping light supply operation (operation mode) can be switched from the communication mode to the wait mode including the state where the supply is stopped, whereby the waste of pumping energy can effectively be suppressed.

If the pumping power supply operation is switched from the communication mode to the wait mode when the signal power $P_S$ changes to a set value or less, the operation mode switching can easily be determined. If the pumping power supply operation is switched from the communication mode to the wait mode when the amount of decrease in signal power $P_S$ per unit time changes by a set value or more, a long-time fluctuation in signal power $P_S$ will be kept from being erroneously determined to be a break in the optical waveguide.

Further, the switching of pumping light supply operations to the optical waveguide may be determined according to both of the power $P_P$ of pumping light supplied to the optical waveguide and the signal power $P_S$. It is preferred that the operation mode switching control be carried out, for example, when the ratio ($P_S/P_P$) between the signal power $P_S$ and pumping light power $P_P$ changes to a set value or less or when the amount of decrease in the ratio ($P_S/P_P$) between the signal power $P_S$ and pumping light power $P_P$ per unit time changes by a set value or more. In each case, a fluctuation in signal power $P_S$ caused by a long-time fluctuation in pumping light power $P_P$ is kept from being erroneously determined to be a break in the optical waveguide.

The optical transmission system according to the present invention comprises an optical fiber line for transmitting signals and a Raman amplifier for Raman-amplifying powers of these signals, whereas the signals propagate with their powers being Raman-amplified, thereby being excellent in transmission quality. When the Raman amplifier is configured so as to supply Raman amplification pumping light to the optical fiber line (cause the optical fiber line itself, which is an optical transmission medium, to function as a Raman amplification optical fiber), the signal powers are Raman-amplified in the laid optical fiber line, whereby repeating sections can be elongated. When a line switch for switching between the optical fiber line and a bypass optical fiber line different therefrom is provided, the signal transmission is kept from being interrupted by an operation for restoring the broken optical fiber line.

What is claimed is:

1. An operation mode switching apparatus comprising:
   a first detector for detecting a signal power $P_S$ after Raman amplification from an optical waveguide to which Raman amplification pumping light is supplied; and
   a control section for switching a pumping light supply operation according to said signal power $P_S$ detected by said first detector between a communication mode in which a power of pumping light supplied to said optical waveguide is maintained at a first level enabling Raman amplification or higher, and a wait mode in which said power of pumping light supplied to said optical waveguide is maintained at a second level, including a state where said pumping light is stopped from being supplied, lower than said first level or less,
   wherein said control section switches said pumping light supply operation to said optical waveguide from said communication mode to said wait mode when said signal power $P_S$ changes to a set value or less.

2. An operation mode switching apparatus comprising:
a first detector for detecting a signal power $P_S$ after Raman amplification from an optical waveguide to which Raman amplification pumping light is supplied; and
a control section for switching a pumping light supply operation according to said signal power $P_S$ detected by said first detector between a communication mode in which a power of pumping light supplied to said optical waveguide is maintained at a first level enabling Raman amplification or higher, and a wait mode in which said power of pumping light supplied to said optical waveguide is maintained at a second level, including a state where said pumping light is stopped from being supplied, lower than said first level or less,
wherein said control section switches said pumping light supply operation to said optical waveguide from said communication mode to said wait mode when the amount of decrease in said signal power $P_S$ per unit time changes by a set value or more.

3. An operation mode switching apparatus according to claim 1, further comprising a shutter, disposed on an optical path of pumping light directed from a pumping light source to said optical waveguide, for locking passage of said pumping light;
wherein said control section controls opening/closing of said shutter according to said signal power $P_S$ detected by said first detector.

4. An operation mode switching apparatus comprising:
a first detector for detecting a signal power $P_S$ after Raman amplification from an optical wave guide to which Raman amplification pumping light is supplied; and
a control section for switching a pumping light supply operation according to said signal power $P_S$ detected by said first detector between a communication mode in which a power of pumping light supplied to said optical waveguid is maintained at a first level enabling Raman amplification or higher, and a wait mode in which said power of pumping light supplied to said optical waveguide is maintained at a second level, including a state where said pumping light is stopped from being supplied, lower than said first level or less,
a second detector for detecting a power $P_P$ of pumping light supplied to said optical waveguide;
wherein said control section switches said pumping light supply operation between said communication mode and said wait mode according to both of said signal power $P_S$ detected by said first detector and said pumping light power $P_P$ detected by said second detector.

5. An operation mode switching apparatus according to claim 4, wherein said control section switches said pumping light supply operation to said optical waveguide from said communication mode to said wait mode when the ratio $(P_S/P_P)$ between said signal power $P_S$ and said pumping light power $P_P$ changes to a set value or less.

6. An operation mode switching apparatus according to claim 4, wherein said control section switches said pumping light supply operation to said optical waveguide from said communication mode to said wait mode when the amount of decrease in ratio $(P_S/P_P)$ between said signal power $P_S$ and said pumping light power $P_P$ per unit time changes by a set value or more.

7. A Raman amplifier comprising:
an optical waveguide for Raman-amplifying a signal power when Raman amplification pumping light is supplied thereto;
a pumping light source for supplying said Raman amplification pumping light to said optical waveguide; and
the operation mode switching apparatus according to claim 1 for switching and controlling a pumping light supply operation to said optical waveguide according to a signal power $P_S$ after Raman amplification.

8. An optical transmission system comprising an optical fiber line for transmitting signals, and the Raman amplifier according to claim 7 for Raman-amplifying a power of said signals.

9. An optical transmission system according to claim 8, wherein said Raman amplifier supplies said Raman amplification pumping light to said optical fiber line, and amplifies respective powers of said signals in said optical fiber line.

10. An optical transmission system comprising:
an optical fiber line for transmitting signals;
a Raman amplifier for Raman-amplifying a power of said signals, said Raman amplification having:
an optical waveguide for Raman-amplifying a signal power when Raman amplification pumping light is supplied thereto;
a pumping light source for supplying said Raman amplification pumping light to said optical waveguide; and
an operation mode switching apparatus for switching and controlling a pumping light supply operation to said optical waveguide according to a signal power $P_S$ after Raman amplification, said operation mode switching apparatus including:
a first detector for detecting a signal power $P_S$ after Raman amplification from an optical waveguide to which Raman amplification pumping light is supplied, and
a control section for switching a pumping light supply operation according to said signal power $P_S$ detected by said first detector between a communication mode in which a power of pumping light supplied to said optical waveguide is maintained at a first level enabling Raman amplification or higher, and a wait mode in which said power of pumping light supplied to said optical waveguide is maintained at a second level, including a state where said pumping light is stopped from being supplied, lower than said first level or less,
a bypass optical fiber line different from said optical fiber line; and
a line switch for switching between said optical fiber line and said bypass optical fiber line in synchronization with switching control of pumping light supply operation in said operation mode switching apparatus.

11. A Raman amplifier comprising:
an optical waveguide for Raman-amplifying a signal power when Raman amplification pumping light is supplied thereto;
a pumping light source for supplying said Raman amplification pumping light to said optical waveguide; and
the operation mode switching apparatus according to claim 2 for switching and controlling a pumping light supply operation to said optical waveguide according to a signal power $P_S$ after Raman amplification.

12. An optical transmission system comprising an optical fiber line for transmitting signals, and the Raman amplifier according to claim 11 for Raman-amplifying a power of said signals.

13. An optical transmission system according to claim 12, wherein said Raman amplifier supplies said Raman amplification pumping light to said optical fiber line, and amplifies respective powers of said signals in said optical fiber line.

14. A Raman amplifier comprising:

an optical waveguide for Raman-amplifying a signal power when Raman amplification pumping light is supplied thereto;

a pumping light source for supplying said Raman amplification pumping light to said optical waveguide; and the operation mode switching apparatus according to claim 4 for switching and controlling a pumping light supply operation to said optical waveguide according to a signal power $P_S$ after Raman amplification.

15. An optical transmission system comprising an optical fiber line for transmitting signals, and the Raman amplifier according to claim 14 for Raman-amplifying a power of said signals.

16. An optical transmission system according to claim 15, wherein said Raman amplifier supplies said Raman amplification pumping light to said optical fiber line, and amplifies respective powers of said signals in said optical fiber line.

* * * * *